Oct. 24, 1961 J. P. LEKAS ET AL 3,005,646

MEANS FOR SPACED ALIGNMENT

Original Filed Jan. 7, 1952

INVENTORS
JOHN P. LEKAS
BY LESTER L. KILPATRICK

William R. Lane
ATTORNEY 3,005,646

MEANS FOR SPACED ALIGNMENT

John P. Lekas, Hollywood, and Lester L. Kilpatrick, Downey, Calif., assignors to North American Aviation Inc.

Original application Jan. 7, 1952, Ser. No. 265,254, now Patent No. 2,750,579, dated June 12, 1956. Divided and this application Oct. 31, 1955, Ser. No. 546,376
7 Claims. (Cl. 287—53)

This invention relates to a means for accurately aligning and spacing a disc and a magnetic head assembly.

This is a divisional application from application Serial No. 265,254, now Patent No. 2,750,579, filed January 7, 1952, in the names of John P. Lekas and Lester L. Kilpatrick for "Magnetic Disc Data Storage Device."

In magnetic data storage devices, it is customary to designate the electromagnets used for impressing magnetic signals onto the high remanence material or for extracting the signals from the impressed material as magnetic recording heads and magnetic reading heads, respectively. When cylindrical drums are used, special heads requiring several laminations are necessary in order to generate a sufficiently high intensity magnetic field to impress a usable signal upon the surface of the high remanence material painted, plated, or otherwise attached to the outside of the drum, and to efficiently extract the signal so impressed. Use of a large amount of ferromagnetic material, even though laminated, results in high eddy current and hysteresis losses.

This invention contemplates a device in which it is necessary to use only a single lamination to obtain the desired result. By combining a disc and a novel single-lamination magnetic head assembly of this invention in the manner herein described it is possible to achieve the same magnetic field strength over a smaller area of the magnetized medium with less magnetomotive force than is possible with a drum, and to extract with high efficiency the signal so impressed, thus increasing the storage capacity of a given area of the high remanence material.

In order to achieve the results described, it is necessary to carefully align and closely space the disc and the magnetic head assembly. To do this satisfactorily it is necessary to use special alignment devices of an improved and superior nature.

It is a further object of this invention to provide a mechanical means for accurately aligning a disc perpendicular to its axis of rotation.

It is still another object of this invention to provide a means for maintaining uniform spacing between a medium to be magnetized and magnetic heads provided for recording on and releasing information from the medium.

Other objects of invention will become apparent from the following description taken in connection with the accompanying drawings, in which—

Figure 8:
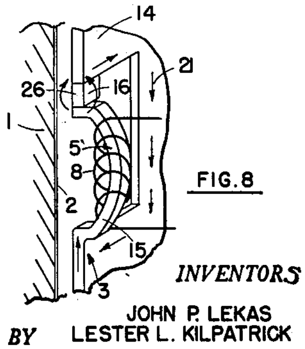

And FIG. 8 is a schematic drawing showing the direction of magnetic flux flow when one particular embodiment of this invention is used for magnetizing high remanence material in the plane of the high remanence material.

Figure 1:
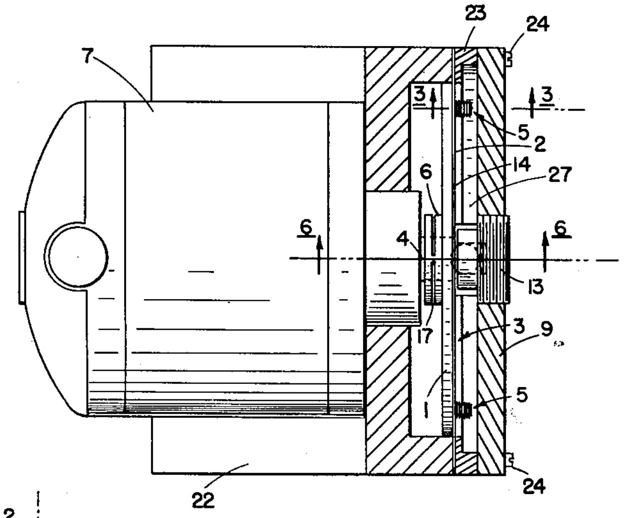
FIG. 1 is a cross-sectional drawing of one embodiment of the magnetic disc data storage device.
Figure 2:
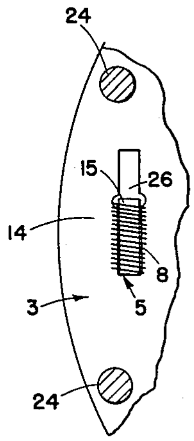
FIG. 2 is a partial plan view of the magnetic head assembly shown in FIG. 1.
Figure 3:
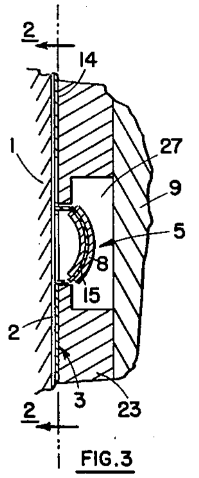
FIG. 3 is a sectional view of the magnetic head assembly of this invention taken at 3—3 in FIG. 1.

Referring to FIG. 1, prime mover 7 turns drive shaft 4, coupling and aligning device 6 and disc 1, on which high remanence material 2 is painted, plated, or otherwise attached. Adjacent, parallel, and very close to high remanence material 2 is magnetic head assembly 3 comprising single lamination 14 common to all of magnetic heads 5. Each magnetic head 5 has a lore comprising tab 15 rising out of lamination 14 and being an integral part thereof. Tab 15 forms a small loop and returns to the plane of lamination 14 on the side next to high remanence magnetic material 2. Each head 5 has a coil 8 which is used as an exciting coil to supply a changing magnetic field if head 5 is a recording head, and which acts as a detector coil to detect changing magnetic fields if head 5 is a reading head. Because lamination 14 is very thin, it is necessary to support lamination 14 and tab 15 in a fixed position. Mechanical head assembly support plate 23 is provided for this purpose. All parts between prime mover 7 and magnetic head assembly support plate 23 are enclosed in assembly housing 22. Backing plate 9 is attached externally to magnetic head assembly support plate 23. Housing screws 24 pass through backing plate 9 and support plate 23 into housing 22, thereby holding the entire device together. Backing plate screw 13 passes through backing plate 9 having a socket 12 on its innerface, wherein spherical spacing ball 11 fits against pressure plate 25 at the bottom of socket 12. Spacing ball 11 fits into socket 10 on the end of drive shaft 4. By turning backing plate screw 13, shaft 4 is forced to move axially several ten-thousandths of an inch, thus creating the desired spacing between disc 1 and magnetic head assembly 3.

Figure 4:
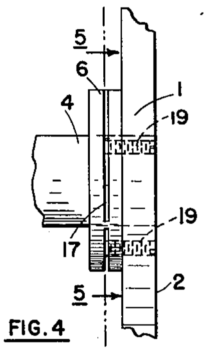
FIG. 4 shows the details of a coupling device for aligning a disc perpendicular to its axis of rotation.
Figure 5:
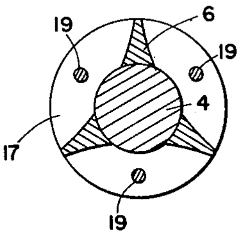
FIG. 5 is a cross-sectional view of the device shown in FIG. 4 taken at 5—5 in FIG. 4.

Referring to FIGS. 4 and 5, coupling 6 is rigidly attached to disc 1. Three set-screws 19 pass through disc 1 into the portion of coupling 6 next to disc 1, penetrating into slots 17 then resting firmly against the portion of coupling 6 farther away from disc 1. Slots 17 are machined into coupling 6 leaving only enough solid material to carry the load of disc 1. Set-screws 19 are positioned midway between the load-carrying portions which separate individual slots 17. Adjustment of set-screws 19 cause concentrated loads to be applied halfway betwen ends of individual slots 17 to the portion of coupling 6 farther away from disc 1, which in turn bends in flexure as a beam supported at its two ends. Or, in other words, the portion of coupling 6 farther away from disc 1 bends in flexure between the ends of individual slots 17 as concentrated loads are applied midway between any two of the ends by set-screws 19. Coupling 6 is caused to tighten against shaft 4 at the point of contact between shaft 4 and the portion of coupling 6 farther away from disc 1. This tightening of the outer portion of coupling 6 in turn causes the inner portion of coupling 6 and adjacent disc 1 to bend, whereby disc 1 may be aligned perpendicular to its axis of rotation by varying the adjustments of set-screws 19.

Figure 6:
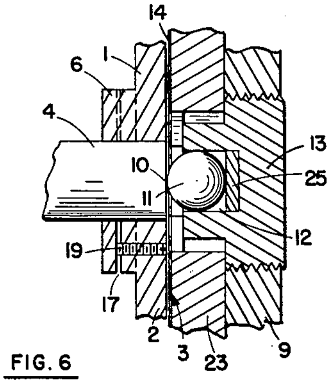
FIG. 6 is a cross-sectional view of the device shown in FIG. 1 taken at 6—6 in FIG. 1.
Figure 7:
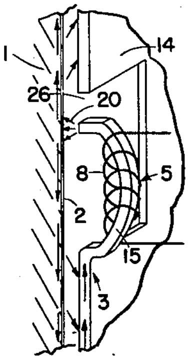
FIG. 7 is a schematic drawing showing the direction of magnetic flux flow when one particular embodiment of this invention is used for magnetizing high remanence material in a direction perpendicular to the plane of the high remanence material.

Referring to FIG. 6, a detailed view of the method of spacing disc 1 and a plate or lamination 3 adjacent and parallel to disc 1 when disc 1 is perpendicular to its axis of rotation may be observed.

The close spacing of information upon high remanence material 2 is achieved in this invention by using a very small pole-piece tab 15 made from a single lamination. A single lamination is adequate in this device, because a very low magnetomotive force is required to create a high flux density. Very low magnetomotive force is required in this invention to create a high flux density because of the extremely short spacing between head 5 and high remanence material 2. Short spacing without touching is achieved in this device by special alignment and spacing means shown in FIGS. 4, 5, and 6. Due to the close spacing and alignment mentioned above, another achievement of this device is to provide an output signal many times larger than any similar device heretofore constructed.

The operation of this invention will be described in the following discussion.

One common method of storing information is to impress voltages representing the desired information onto the electrical coil of an electromagnet with a ferromagnetic core. The ferromagnetic core modifies the shape of the magnetic field and may be used to concentrate it into a small cross-sectional area. If a material having a high remanence characteristic is brought into the high intensity field the material becomes magnetized in proportion to the applied field intensity and remains magnetized if removed from the vicinity of the field. If the high remanence material is moved through a recording field at a uniform velocity, said field being caused by changes in voltage across the excitation coil of the recording head, the variations of excitation voltage will be transferred to the high remanence material in the form of variations of degree of magnetization thereof. The magnetized path will, in reality, be a plot of the information desired to be stored against time, because the high remanence material passes through the recording field at a uniform velocity. At another point on the track a similar magnetic head, used as a reading head, may be placed. Movement of the high remanence material will cause voltages to be induced in the coil of the reading head which are proportional to the change of intensity of the magnetic field passing under the reading head at any particular time. It may be seen from the inverse square law of magnetism that the closer the high remanence material passes to the recording head the higher the degree of magnetization which will be impressed upon the high remanence material for a given magnetomotive force; and the closer the high remanence material passes to the reading head, the stronger will be the induced voltage in the coil of the reading head. The degree of success with which close spacing can be achieved with a cylindrical arrangement which requires that the spacing between each head and the cylinder be individually adjusted, depends upon eccentricities of the cylinder, the rigidity of the bearings, and the thermal expansion of the cylinder. Thermal expansion of a cylinder is very significant because the linear movement of the cylinder in a radial direction is not only directly proportional to the absolute temperature of the cylinder but is also directly proportional to the radius of the cylinder. The advantages of using a disc instead of a cylinder are readily apparent. The disc may be machined flat to a few spectral lines, if necessary, and may be aligned into a plane perpendicular to its axis of rotation by special techniques with the help of alignment devices claimed in this invention. Thus, with a disc, the magnetic heads may also be machined flat and with one adjustment spaced very close to the disc within several ten-thousandths of an inch without being affected by eccentricity, small deviations in the drive shaft bearing or thermal expansion. Thermal expansion, in a disc, although also directly proportional to the absolute temperature, is only proportional to the thickness of the disc which may be made as thin as mechanically expedient. It may therefore be seen that the thermal expansion effects of the disc are very small compared to those of the cylinder. With a cylindrical arrangement, a high magnetic field is required because of the wide spacing between the magnetic heads and the high remanence material on the outside surface of the cylinder. In order to obtain a high degree of magnetization in the high remanence material, it is necessary to use a considerable quantity of ferromagnetic material in the magnetic heads, requiring lamination of the heads to reduce eddy current losses. Because of the large amount of ferromagnetic material required, the field of the magnetic head may not be concentrated into a very small cross-sectional arrangement. When a disc instead of a cylinder is used in the manner set forth in this invention, the magnetic heads require less magnetomotive force to obtain a high flux density. Because of the close spacing between each head and the high remanence material, a single, thin lamination is all that is required in this invention to provide the desired flux density to impress a high level signal on the high remanence material. By the device described in this invention individual signals may be impressed closer together or at a higher density than that possible with a multilamination head because of the small size of a single lamination.

In this invention a high degree of magnetization is accomplished where magnetization of the high remanence material in the plane of the high remanence material is desired, by fabricating the disc 1 of nonmagnetic material. By spacing the end of tab 15 on magnetic head 5 as close as possible to lamination 14 and firmly spacing tab 15 in a fixed position by insertion of nonmagnetic material 16 between the end of tab 15 and lamination 14, the direction of flow of magnetic flux is directly off the end of tab 15 to lamination 14 without passing through disc 1. Because high remanence material 2 passes close to gap 26 filled by nonmagnetic material 16, a high degree of magnetization of high remanence material 2 is accomplished by virtue of leakage flux around the edge of gap 26.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, a shaft, a disc coaxial with said shaft, means for aligning said disc relative to said shaft, said aligning means comprising a coupling attaching said disc to said shaft and adjustable means for bending said coupling, a flat, rigid element parallel to said disc and coaxial with said shaft, means for spacing said flat, rigid element and said disc, said spacing means comprising a spacing ball and adjustable screw means bearing against said spacing ball, connected to space said element of rigid material relative to said disc.

2. A device as recited in claim 1 in which said coupling has a plurality of slots cut therein, a plurality of screws passing through said disc, penetrating into the slots of said coupling.

3. A device as recited in claim 1 in which said adjustable screw means is attached to said rigid element and bears against said spacing ball, and said spacing ball bears against said shaft, whereby positioning said rigid element relative to said disc is obtained by adjusting said screw means.

4. In combination, a shaft, a disc coaxial with said shaft, means for aligning said disc perpendicular to said shaft, said means comprising a coupling attaching said disc to said shaft, a plurality of slots cut into said coupling, a plurality of screws passing through said disc, penetrating into said coupling into said slots, said screws being positioned whereby relative adjustment of said screws causes said coupling to bend in flexure, a flat rigid element coaxial with said shaft, means for spacing said rigid element and said disc, said means comprising a spacing ball, adjustable screw means attached to said rigid element and bearing against said spacing ball, said spacing ball resting against said disc, thereby positioning said flat rigid element relative to said disc.

5. In combination, a shaft, a first disc coaxial with said shaft, means for aligning said first disc perpendicular to said shaft, said means comprising a coupling attaching said first disc to said shaft, at least one slot cut into said coupling on a plane perpendicular to the axis of said shaft, and at least one set screw for each said slot, said set screw passing through said first disc in a direction parallel to the axis of said shaft, penetrating into said coupling into said slot and coming to rest against the wall of said slot of said coupling farther away from said first disc, each said set screw being circumferentially positioned to enter said each said slot symmetrically whereby relative adjustment of each said set screw causes said coupling to bend in flexure in a varying amount depending upon said adjustment, thereby aligning the plane of said disc perpendicular to its axis of rotation; a second disc coaxial with said shaft; means for spacing said discs at an accurately predetermined distance, said means comprising a frame for supporting one of said discs; a spacing ball, a socket in the center of the second said disc, a screw relatively fixed with respect to said frame, a socket in the center of said screw, and said spacing ball positioned in said socket against said first disc whereby adjustment of said screw against said spacing ball determines the clearance between said discs.

6. Means for aligning a disc perpendicular to a shaft comprising a coupling attached to said disc adjacent said shaft, extending parallel to and surrounding the axis of said shaft in a direction away from said disc; a plurality of slots cut into said coupling on the same plane perpendicular to the axis of said disc, said slots being equally spaced around the circumference of said coupling, extending from the outside of said coupling inward to said shaft leaving enough solid material between said slots to carry the load of said disc; and a set screw for each slot passing through said disc in a direction parallel to the axis of said shaft, penetrating into said coupling into its associated slot and coming to rest against the portion of said coupling farther away from said disc, said portion being opposite said associated slot, said set screws being circumferentially positioned to enter said slots midway between said load carrying solid material whereby relative adjustment of said set screws causes said portion of said coupling farther away from said disc to bend in flexure in a varying amount depending upon said adjustment, thereby aligning the plane of said disc perpendicular to its axis of rotation and tightening said coupling about said shaft at the lowest point of contact between said coupling and said shaft.

7. Means for aligning a disc on a shaft coaxial therewith comprising a coupling attaching said disc to said shaft, at least two slots cut into said coupling on a plane perpendicular to the axis of said shaft, and at least one screw for each said slot, said screws each passing through said disc in a direction parallel to the axis of said shaft, penetrating said coupling into an associated one of said slots and coming to rest against the wall of said slotted coupling farther away from said disc, said screws being circumferentially positioned to enter said slots symmetrically whereby relative adjustment of said screws causes said coupling to bend in flexure in a varying amount depending upon said adjustment, thereby aligning the plane of said disc perpendicular to its axis of rotation.

References Cited in the file of this patent

UNITED STATES PATENTS

| | | |
|---|---|---|
| 156,474 | Beck et al. | Nov. 3, 1874 |
| 666,291 | Wardwell | Jan. 22, 1901 |
| 1,462,716 | Masin | July 24, 1923 |
| 2,375,680 | Obedin | May 8, 1945 |
| 2,434,018 | Stepanoff | Jan. 6, 1948 |
| 2,546,529 | Speicher | Mar. 27, 1951 |